(12) United States Patent
Huang

(10) Patent No.: US 6,240,190 B1
(45) Date of Patent: *May 29, 2001

(54) SYNCHRONIZED SOUNDING/FLASHING CIRCUIT

(75) Inventor: Chi-mao Huang, Toutiu (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 08/299,914

(22) Filed: Sep. 1, 1994

(51) Int. Cl.$^7$ ..................................................... H03G 3/00
(52) U.S. Cl. ............................................. 381/61; 446/401
(58) Field of Search ........................... 381/61; 84/464 R; 446/401, 397, 473, 484, 485

(56) References Cited

U.S. PATENT DOCUMENTS

| | | | |
|---|---|---|---|
| 3,737,722 | * 6/1973 | Scharlack | 446/485 |
| 5,111,113 | * 5/1992 | Chu | 84/464 R |
| 5,113,738 | * 5/1992 | Krucoff | 84/464 R |
| 5,461,188 | * 10/1995 | Drago et al. | 84/464 R |

FOREIGN PATENT DOCUMENTS

| | | | |
|---|---|---|---|
| 1604881 | * 12/1981 | (GB) | 446/401 |
| 1217447 | * 3/1986 | (SU) | 84/464 R |
| 1301423 | * 4/1987 | (SU) | 84/464 R |
| 1569027 | * 6/1990 | (SU) | 84/464 R |

* cited by examiner

*Primary Examiner*—Curtis Kuntz
*Assistant Examiner*—Ping W Lee
(74) *Attorney, Agent, or Firm*—William E. Pelton, Esq.

(57) ABSTRACT

A synchronized sounding/flashing circuit includes a sound synthesizer stored with sound data and emitting sound signal upon being supplied with power, a digital-to-analog converter connected to the sound synthesizer for converting the sound signal to an analog signal for driving an external speaker, a sound level/density detector connected to the sound synthesizer for generating a detected signal in response to the sound signal therefrom, a frequency generator being connected to the sound synthesizer and triggered thereby when the sound synthesizer outputs the sound signal and outputting a signal having a frequency according to the detected signal, a flasher being connected to the sound synthesizer and triggered thereby when the sound synthesizer outputs the sound signal, and being connected to the frequency generator for sequentially and alternately outputting a pulse from a plurality of output terminals thereof with a frequency proportional to the frequency of the signal outputted from the frequency generator. A plurality of light emitting diodes are allowed to be connected to the flasher and sequentially flash in a frequency substantially equaling the frequency of the signal from the frequency generator.

3 Claims, 2 Drawing Sheets

SYNCHRONIZED SOUNDING/FLASHING CIRCUIT

BACKGROUND OF THE INVENTION

1. Field of the Invention

The present invention relates to a synchronized sounding/flashing circuit to cause a speaker to emit sound intermittently and to cause a plurality of lights to alternately flash in response to the occurrence of the emitted sound.

2. Description of the Prior Art

A toy gun can emit intermittent sound when a trigger thereof is depressed on. Some toy guns are configured with a plurality of light emitting diodes which emit light alternately thus providing sound and flash effects. FIG. 4 is a conventional sounding/flashing circuit used to control a toy gun to emit sound and flashing light. The conventional sounding/flashing circuit comprises a sounding synthesizer 50, a flasher 60, and a digital-to-analog (D/A) converter 70. The sound synthesizer 50 comprises an output terminal 51 for outputting a sound signal and an enabling output terminal 52 for sending out an enable signal upon being supplied with power or being triggered. The sound synthesizer 50, when supplied with power, will emit an intermittent sound signal to the D/A converter 70 which converts the sound signal to an analog signal and transmits the analog signal to a speaker SP thus enabling the latter to emit intermittent sound similar to the firing sound of a machine gun. The sound synthesizer 50 sends the sound signal to the D/A converter 70, in the meantime it triggers the flasher 60 to enable a plurality of LEDs 61 connected thereto to flash alternately. The conventional sounding/flashing circuit can provide concurrent sound and flash effects, yet the flash from the LEDs 61 is in constant frequency thus cannot indicate the realistic occurrence of the intermittent firing sound. It is requisite to provide a new sounding/flashing circuit which synchronizes the sound and flash emitted from a toy gun thus increasing the realism of the toy gun.

SUMMARY OF THE INVENTION

The primary objective of the present invention is to provide a synchronized sounding/flashing circuit for automatically changing the flashing occurrence in response to variable occurrence of the firing sound.

In accordance with one aspect of the invention, there is provided a synchronized sounding/flashing circuit which includes a sound synthesizer stored with sound data and emitting a sound signal upon being supplied with power, a digital-to-analog. converter connected to the sound synthesizer for converting the sound signal to an analog signal for driving an external speaker, a sound level/density detector connected to the sound synthesizer for generating a detected signal in response to the sound signal therefrom, a frequency generator being connected to the sound synthesizer and triggered thereby when the sound synthesizer outputs the sound signal and outputting a signal having a frequency according to the detected signal, a flasher being connected to the sound level/density detector and triggered thereby when the sound level/density detector outputs the detected signal, and being connected to the frequency generator for sequentially and alternately outputting a pulse from a plurality of output terminals thereof with a frequency proportional to the frequency of the signal outputted from the frequency generator.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
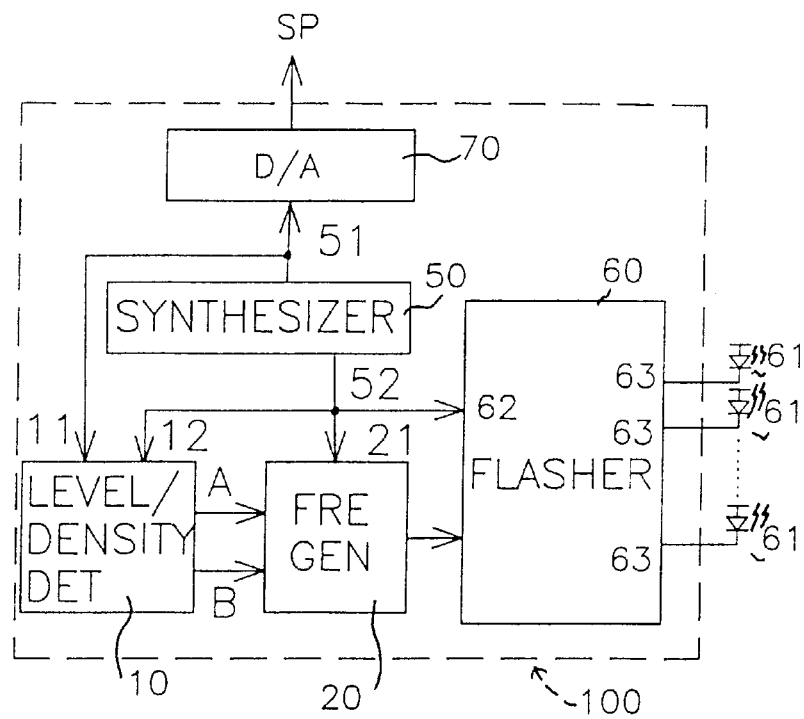
FIG. 1 is a sounding/flashing synchronized circuit in accordance with the present invention.
Figure 4:
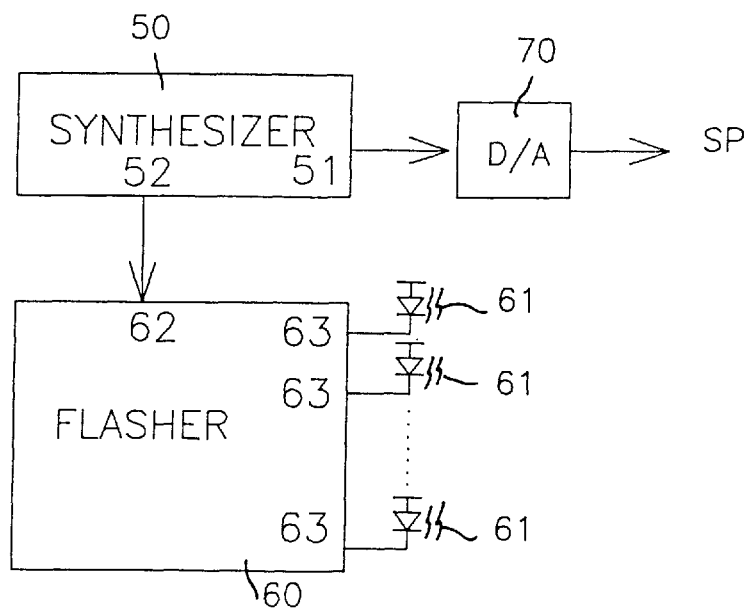
FIG. 4 is a conventional sounding/flashing synchronized circuit yet the flashing frequency thereof is constant.

Referring to FIG. 1, a synchronized sounding/flashing circuit 100 in accordance with the present invention comprises a sound synthesizer 50, a digital-to-analog converter (D/A) 70, a flasher 60, a sound level/density detector 10, and a frequency generator 20. The sound synthesizer 50 has been installed with sound data therein. The sound synthesizer 50 outputs a sound signal from an output terminal 51 thereof upon being supplied with power and in the meantime outputs a triggering signal from an enable output terminal 52 thereof. The sound synthesizer 50, the digital-to-analog converter (D/A) 70, the flasher 60, and the LEDs 61 are the same as those mentioned in the conventional sounding/flashing circuit of FIG. 4. The sound level/density detector 10 includes an input terminal 11 connected to the output terminal 51 of the sound synthesizer 50 for receiving the sound signal therefrom. The sound level/density detector 10 comprises a volume detecting logic device and an up/down counter for respectively detecting the volume level and occurrence of the inputted sound signal. The sound level/density detector 10 comprises two output terminals A and B each of which may output a logical high "1" or logical low "0" signal thus the combination of signal from terminals A, B may be either "00", "01", "10", or "11". The frequency generator 20 comprises an enable input terminal 21 which is connected to the enable output terminal 52 of the sound synthesizer 50, thus when the sound synthesizer 50 is emitting sound, the frequency generator 20 is immediately enabled by the triggering signal from the sound synthesizer 50. The frequency generator 20 generates a corresponding frequency signal in response to the output combination "AB" from the sound level/density detector 10. For example, the frequency generator 20 may generate a signal with frequency 6 Hz, 3 Hz, 1.5 Hz, or 0.75 Hz, therefore, an output combination "AB" from the sound level/density detector 10 will cause a corresponding frequency signal to be outputted from the frequency generator 20 if the latter is enabled by the sound synthesizer 50. The sound level/density detector 10 comprises an enable input terminal 12 connected to the enable output terminal of the sound synthesizer 50 for receiving the triggering signal therefrom and being triggered thereby. The is flasher 60 includes an enable input terminal 62 connected to the enable output terminal 52 of the sound synthesizer 50, thus when the sound level/density detector 10 outputs the combination signal "AB" to the frequency generator 20, the flasher 60 is also enabled by the triggering signal from the sound synthesizer 50. The flasher 60 alternately and sequentially outputs a logical low pulse from the output terminals 63 thereof with a frequency proportional to the frequency of the signal outputted from the frequency generator, thereby alternately turning on/off each LED 61 in a sequential manner and the LEDs 61 together illustrate a spot moving forward similar to a bullet being fired outward from a gun. The moving speed of the spot is proportional to the flashing occurrence of the LEDs 61.

Figure 2:
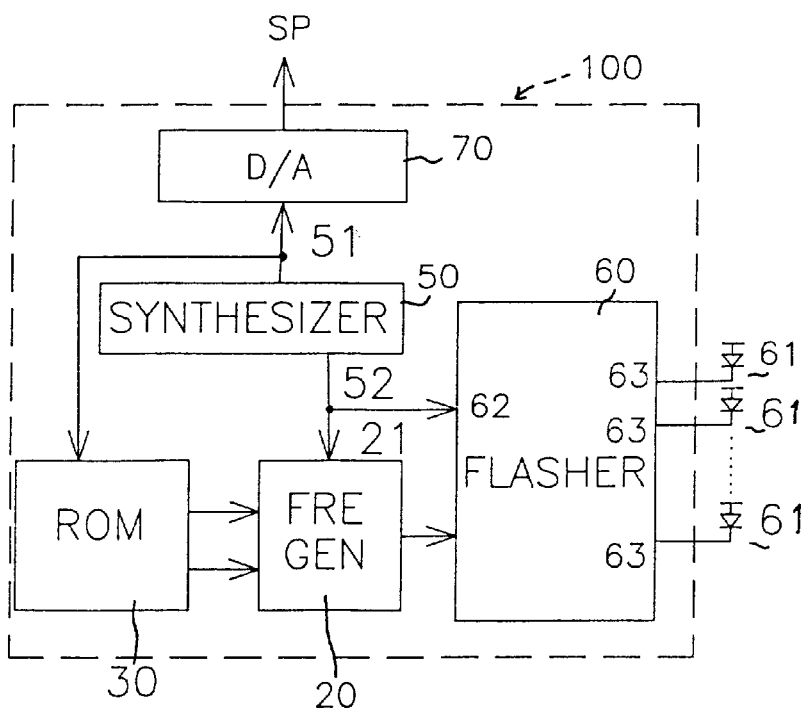
FIG. 2 is an alternative embodiment of a sounding/flashing synchronized circuit in accordance with the present invention.

Referring to FIG. 2, an alternative embodiment of the present invention is illustrated. In this embodiment, the flasher 60 has the enable input terminal 62 thereof connected to the enable output terminal 52 of the sound synthesizer 50 and is enabled by a signal outputted from the enable output terminal 52 of the sound synthesizer 50 when the latter outputs the sound signal. A read only memory (ROM) 30 replaces the sound level/density detector 10. The ROM 30 has been stored with sound occurrence representing data which have been measured in continuous time intervals from the sound information already stored in the sound synthesizer 50, therefore the sound occurrence representing data can faithfully indicates the real occurrence of the sound information outputted from the sound synthesizer 50. In operation, when the sound synthesizer 50 emits the sound signal, corresponding data will be fed from the ROM 30 into the frequency generator 20 and causes the latter to generate corresponding signal with a frequency proportional to the occurrence of the emitted sound. The flasher 60 functions according to the frequency of the inputted signal to cause the LEDs 61 to alternately flash as described in the previous embodiment.

Figure 3:
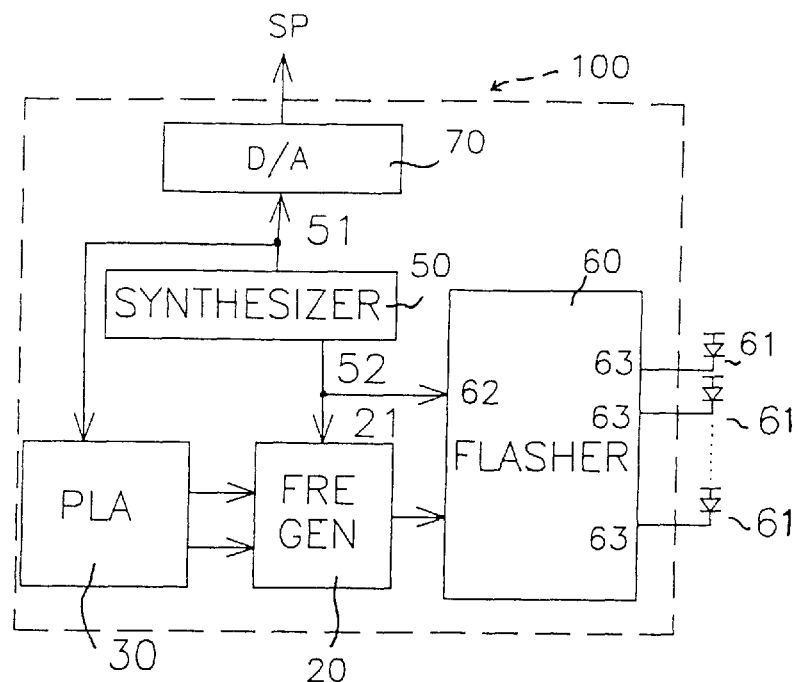
FIG. 3 is another embodiment of a sounding/flashing synchronized circuit in accordance with the present invention.

Referring to FIG. 3, a programmable logic array (PLA) 40 is allowed to replace the ROM 30 of FIG. 2.

The purpose of the PLA 40 is exactly the same as the ROM 30. The PLA 40 has been preprogrammed with sound occurrence representing data which have been measured in continuous time intervals from the sound information already stored in the sound synthesizer 50, therefore the sound occurrence representing data can faithfully indicates the real occurrence of the sound information outputted from the sound synthesizer 50. In operation, when the sound synthesizer 50 emits the sound signal, corresponding data will be fed from the PLA 40 into the frequency generator 20 and causes the latter to generate corresponding signal with a frequency proportional to the occurrence of the emitted sound.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A synchronized sounding/flashing circuit comprising:
   a sound synthesizer stored with sound data and emitting sound signal upon being supplied with power;
   a digital-to-analog converter connected to the sound synthesizer for converting the sound signal to an analog signal for driving an external speaker;
   a sound level/density detector connected to the sound synthesizer for determining a level of the sound signal and an, occurrence of the sound signal, and for generating a control signal in accordance with the determined magnitude and a number of determined occurrences of the sound signal, the sound level/density detector having means for maintaining a count of the determined occurrences of the sound signal;
   a frequency generator being connected to the sound synthesizer and triggered thereby when the sound synthesizer outputs the sound signal and outputting a signal having one of a plurality of available frequencies which is selected in accordance with the control signal supplied by the sound level/density detector; and
   a flasher being connected to the sound synthesizer and triggered thereby when the sound synthesizer outputs the sound signal, and being connected to the frequency generator for sequentially and alternately outputting pulses from a plurality of respective output terminals thereof each pulse having a frequency proportional to the frequency of the signal output from the frequency generator.

2. A synchronized sounding/flashing circuit comprising:
   a sound synthesizer stored with sound data and emitting sound signal upon being supplied with power;
   a digital-to-analog converter connected to the sound synthesizer for converting the sound signal to an analog signal for driving an external speaker;
   a read only memory preprogrammed with sound occurrence representing data which correspond to the sound data stored in the sound synthesizer, the read only memory being connected to the sound synthesizer for outputting a control signal in accordance with one of the sound occurrence representing data corresponding to the sound signal output from the sound synthesizer;
   a frequency generator being connected to the sound synthesizer and triggered thereby when the sound synthesizer outputs the sound signal and outputting a signal having one of a plurality of available frequencies in accordance with the control signal from the read only memory; and
   a flasher being connected to the sound synthesizer and triggered thereby when the sound synthesizer outputs the sound signal, and being connected to the frequency generator for sequentially and alternately outputting pulses from a plurality of respective output terminals thereof each pulse having a frequency proportional to the frequency of the signal output from the frequency generator.

3. A synchronized sounding/flashing circuit comprising:
   a sound synthesizer stored with sound data and emitting sound signal upon being supplied with power;
   a digital-to-analog converter connected to the sound synthesizer for converting the sound signal to an analog signal for driving an external speaker;
   a programmable logical array preprogrammed with sound occurrence representing data which are measured from the sound data stored in the sound synthesizer, the programmable logical array being connected to the sound synthesizer for outputting a control signal in accordance with one of the sound occurrence representing data corresponding to the sound signal output from the sound synthesizer;
   a frequency generator being connected to the sound synthesizer and triggered thereby when the sound synthesizer outputs the sound signal and outputting a signal having one of a plurality of available frequencies in accordance with the control signal from the programmable logical array; and
   a flasher being connected to the sound synthesizer and triggered thereby when the sound synthesizer outputs the sound signal, and being connected to the frequency generator for sequentially and alternately outputting pulses from a plurality of respective output terminals thereof each pulse having a frequency proportional to the frequency of the signal output from the frequency generator.

* * * * *